(12) United States Patent
Keeler

(10) Patent No.: US 7,334,643 B2
(45) Date of Patent: Feb. 26, 2008

(54) UPRIGHT STAND

(76) Inventor: Kevin V. Keeler, P.O. Box 8, Star, ID (US) 83669

(*) Notice: Subject to any disclaimer, the term of this patent is extended or adjusted under 35 U.S.C. 154(b) by 135 days.

(21) Appl. No.: 11/049,372

(22) Filed: Feb. 1, 2005

(65) Prior Publication Data

US 2005/0230126 A1    Oct. 20, 2005

Related U.S. Application Data

(63) Continuation-in-part of application No. 10/703,139, filed on Nov. 4, 2003, now Pat. No. 6,848,512, which is a continuation-in-part of application No. 10/008,681, filed on Dec. 4, 2001, now Pat. No. 6,640,905, which is a continuation-in-part of application No. 09/454,797, filed on Dec. 3, 1999, now Pat. No. 6,325,154.

(51) Int. Cl.
*A01L 7/00* (2006.01)

(52) U.S. Cl. .................. 168/44; 119/816; 119/755; 119/756; 119/757

(58) Field of Classification Search .............. 168/44; 119/816, 755, 756, 757, 788, 712; 248/157, 248/161
See application file for complete search history.

(56) References Cited

U.S. PATENT DOCUMENTS

| | | | | |
|---|---|---|---|---|
| 86,455 A | 2/1869 | Rogers et al. | ................ | 168/44 |
| 89,379 A | 4/1869 | Blackburn | .................... | 168/44 |
| 124,452 A * | 3/1872 | Shimer | ........................ | 168/44 |
| 286,389 A | 10/1883 | Coffey | | |
| 427,012 A | 4/1890 | Reed | | |
| 457,345 A * | 8/1891 | Fox | .............................. | 168/44 |
| 569,819 A | 10/1896 | Davis et al. | | |
| 1,198,467 A | 9/1916 | Maltby | ........................ | 168/44 |
| 1,278,628 A | 9/1918 | France | ........................ | 168/44 |
| 1,330,807 A | 2/1920 | Ilieff | | |
| 1,472,527 A | 10/1923 | Jones | | |
| 2,804,845 A * | 9/1957 | Plumley et al. | ............. | 119/756 |
| 3,092,079 A * | 6/1963 | Strebel et al. | .............. | 119/725 |
| 3,250,252 A * | 5/1966 | Seymour | ..................... | 119/756 |
| 3,524,434 A * | 8/1970 | Finley | ........................ | 119/756 |
| 3,744,457 A * | 7/1973 | Heine et al. | ................ | 119/756 |
| 4,003,341 A * | 1/1977 | La Croix | ..................... | 119/756 |
| 4,167,216 A | 9/1979 | Beaston | ........................ | 168/44 |
| 5,213,061 A | 5/1993 | Zito | ............................ | 119/101 |
| 5,488,926 A * | 2/1996 | Hunt | ........................... | 119/756 |
| 5,979,562 A * | 11/1999 | Hammonds | .................. | 168/44 |

(Continued)

*Primary Examiner*—Yvonne R. Abbott
(74) *Attorney, Agent, or Firm*—Pedersen & Co., PLLC; Ken J. Pedersen; Barbara S. Pedersen

(57) ABSTRACT

An adjustable stand includes a stable base, an upright portion upending from the base, and a platform adjustably locked in the base. The platform height preferably may be adjusted continuously rather than incrementally for precise and accurate positioning of a horse hoof or other animate or inanimate object. One platform includes a diverging U-shaped cradle, with a firm but cushioning/shock-absorbing material on its top side for elevating the supported object and absorbing the concussion of the work being performed on the object. Preferably, the firm but cushioning material is a flexible strap slung across the cradle and spaced above the surface of the cradle at its center region. The preferred plastic base and continuous adjustability of the platform provide a quiet, substantially non-metallic, and non-intimidating stand that tends not to frighten horses or other animals.

22 Claims, 5 Drawing Sheets

U.S. PATENT DOCUMENTS

D491,699 S * 6/2004 Keeler ........................ 168/44
D499,516 S * 12/2004 Fike ......................... D30/143
D509,327 S * 9/2005 Keeler ...................... D30/143
2006/0113090 A1 * 6/2006 DeCola et al. ................ 168/44
2007/0119601 A1 * 5/2007 Leonard ..................... 168/44

* cited by examiner

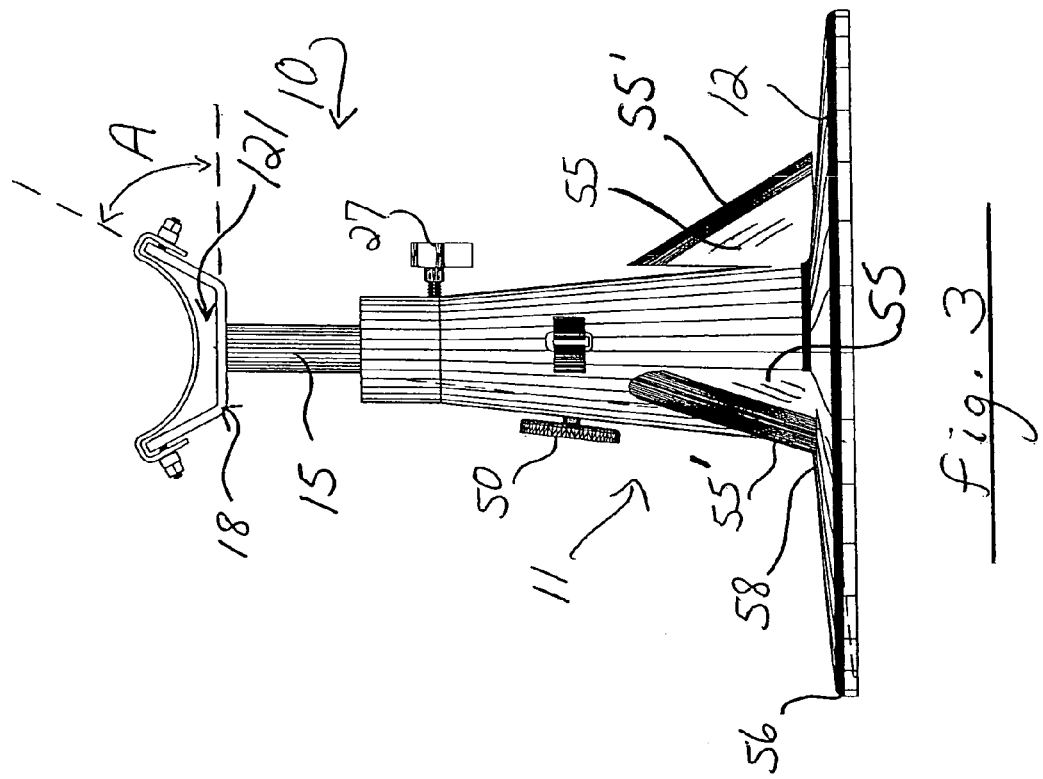
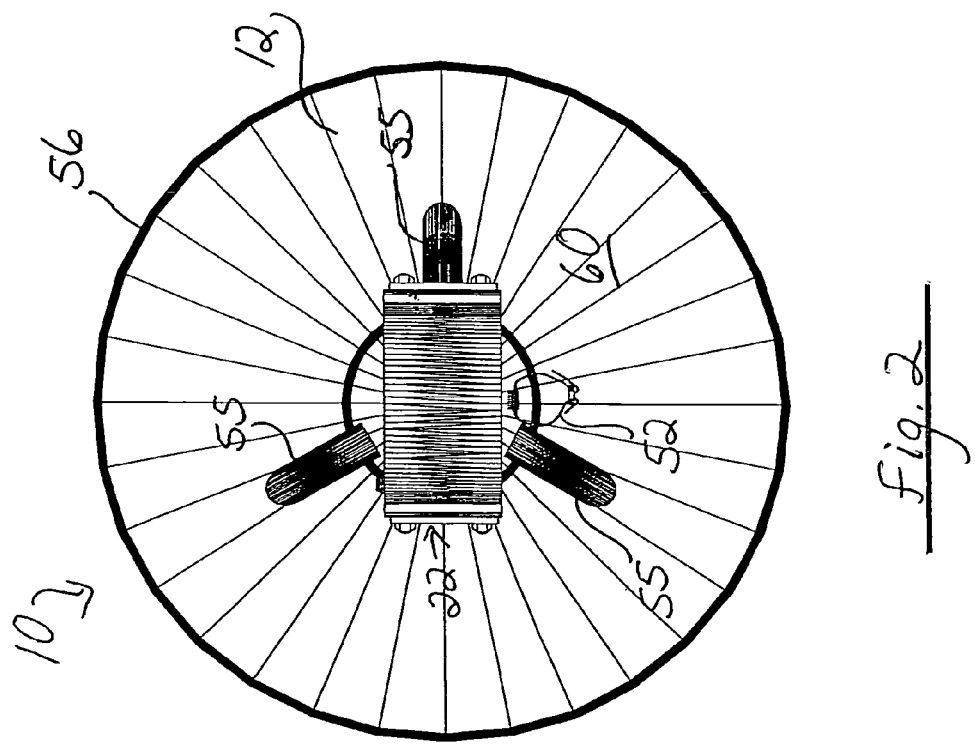

UPRIGHT STAND

BACKGROUND OF THE INVENTION

This application is a continuation-in-part of, and claims priority from, U.S. patent application Ser. No. 10/703,139, filed Nov. 4, 2003, entitled "Horse Owner's and Farrier's Stand" and issuing on Feb. 1, 2005 as U.S. Pat. No. 6,848,512 (the disclosure of which is incorporated herein by this reference), which is a continuation-in-part of U.S. patent application Ser. No. 10/008,681, filed Dec. 4, 2001, entitled "Horse Owner's and Farrier's Stand", issued as U.S. Pat. No. 6,640,905, which is a continuation-in-part of U.S. patent application Ser. No. 09/454,797, filed on Dec. 3, 1999, entitled "Horse Owner's and Farrier's Stand", issued as U.S. Pat. No. 6,325,154 on Dec. 4, 2001 (the disclosure of which is incorporated herein by this reference).

FIELD OF THE INVENTION

This invention generally relates to a stand for farriers, veterinarians, horse or pet owners, pet groomers, marksmen or "shooters", and/or other people who need a portable, stable support device. More particularly, the stand may be used for supporting, for example, a horse's hoof during shoeing or other maintenance, a dog's head during grooming, or a gun during shooting practice or hunting, so that the supported object may be held steady, manipulated easily, and/or controlled in a safe and careful manner.

RELATED ART

Most farriers physically support the horse's leg during shoeing operations by holding the horse's leg between their own legs, with the horse leg coming through the farrier's legs from the farrier's backside. This is a precarious, sometimes dangerous position, and always a physically-demanding position. First, the farrier must remove the old horseshoe. Then the hoof must be trimmed and filed. Next, the new shoe must be fitted to the hoof profile and nailed in place. Finally, the nails are clinched and the anterior profile of the hoof is filed and shaped. All of these operations are best performed with the hoof supported at an elevation above ground level.

U.S. Pat. No. 4,167,216 for a Multiple Stand To Aid Shoeing Horses teaches a two-position, tripod-type stand having a pair of alternating upright members disposed at a right angle with respect to one another. A pair of opposing legs are connected to the vertex joint of the uprights, each at a slightly obtuse angle with respect to both uprights. In one position, one upright extends vertically upward while the second upright acts as the third leg of the tripod. In the second position, the second upright extends vertically upward while the first upright acts as the third leg of the tripod. A hard hoof cradle is attached to the distal end of one of the uprights and a flat plate is attached to the distal end of the other upright. The cradle holds the hoof in an elevated generally horizontal position to provide access to the bottom of the hoof, while the flat plate provides an elevated platform to support the bottom of the hoof to provide convenient access to the anterior of the hoof. An optional upright with an anvil attachment can be removably substituted for either of the other two uprights.

The device of U.S. Pat. No. 4,167,216 has some disadvantages. First, the length of the uprights are not adjustable to accommodate the necessary difference in working height between front and back hooves of a single horse, nor to accommodate different-sized horses. Second, the hoof cradle construction does not provide any concussion absorption and is prone to the hoof dislodging from the cradle. Thirdly, the legs and horizontally extending upright (effectively a leg) pose a hazard both to the farrier and to the horse.

U.S. Pat. No. 89,379 (Blackburn) discloses a rest for shoeing horses with a thick base and a hinged, v-shaped member upon which the horse hoof rests. The arms of the v-shaped member extend vertically upward, and one of the arms is hinged to pivot to the side when the weight of the hoof is placed on the v-shaped member. The Blackburn device includes an incremental ratchet adjustment to raise and lower the v-shaped member relative to the base.

The inventor believes that prior art devices, such as the Blackburn device, would tend to move or make noise in a manner that would upset or frighten the animal. Horses are usually nervous, easily-frightened animals that respond instinctually to noises and unfamiliar or uncomfortable movements according to the well-known "fear-flight" behavior. The inventor believes that prior art devices, which include incremental raising or lowering the upright using a ratchet system, would tend to cause uneven and jerky motion and metallic sounds. The inventor also believes that pivoting/flexing arms or other moving parts would upset/frightened the animal, especially if the pivoting/flexing occurs in response to the weight of the animal's foot and if it causes the stand to "clamp" the foot/hoof.

What is needed is a safe stand that securely and quietly holds a hoof in a generally horizontal position. What is still needed is a stand that is less intimidating and stressful to both horses and users, and that is light-weight, convenient, comfortable and quiet. What is needed is stand that may be used for many purposes, including horse and other animal care, gun aiming and shooting, and/or other work or recreation.

SUMMARY OF THE INVENTION

An object of the present invention is to provide a stand that is preferably substantially made of polymeric material or "plastic", and, therefore quiet and lightweight. A further object of the present invention is to provide a stand that may be conveniently used by farriers, horse owners, pet groomers, marksmen, hunters, craftsmen, or other animal caretakers, sportsmen, or workers, for example, who need to support, manipulate, and/or control an object in a safe and preferably quiet manner.

The stand includes a broad, generally flat base and a support system upending from the base. The support system is preferably adjustable in height and includes an object-receiving platform at its top end. Several object-receiving platforms may be provided that are removable and interchangeable with each other. An especially-preferred object-receiving platform comprises a "cradle" with a sling extending between rigid, non-moving arms, whereby the suspended sling provides stable, but somewhat cushioning, support. The preferred height-adjustment is continuous rather than incremental, and the height-adjustment means preferably is substantially silent and smooth.

BRIEF DESCRIPTION OF THE DRAWINGS

FIG. 2 is a top view of the embodiment of FIG. 1.

FIG. 3 is a side view of the embodiment of FIGS. 1 and 2.

DESCRIPTION OF THE PREFERRED EMBODIMENTS

Figure 1:
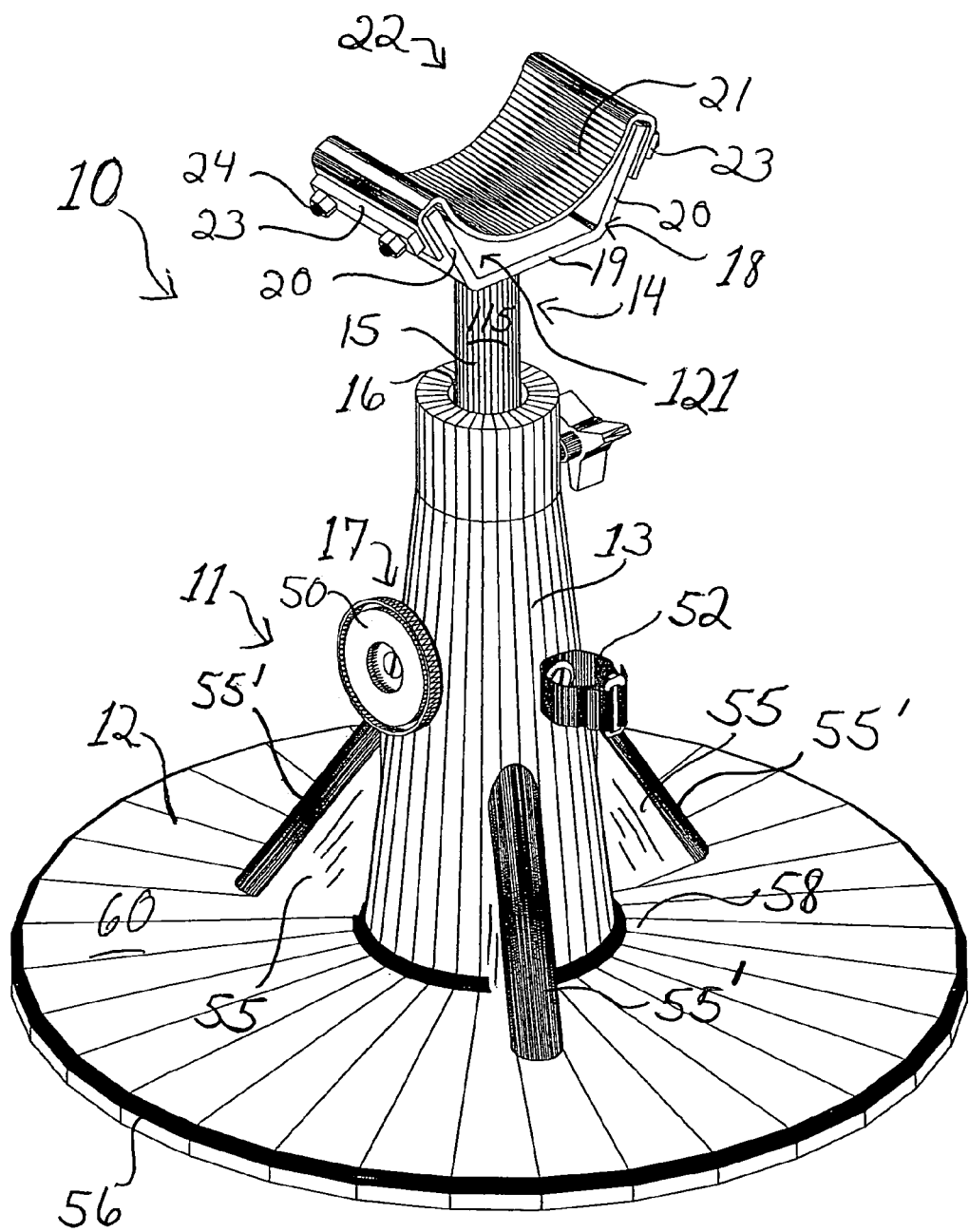
FIG. 1 is a perspective view of one embodiment of a stand according to the invention, with a cradle-style platform.

Some, but not the only, embodiments of the invented stand are shown in detail in the Figures and generally designated as stand 10. Mainly by virtue of its broad base and its being made substantially of plastic, the stand 10 is stable when placed on a surface and also easily moveable to another position or location without significant noise. Of particular note is the quiet, non-frightening sound caused by sliding or otherwise moving the plastic base on a floor, table, or ground, in contrast to the frightening or irritating sound cause by a metal object scraping along or hitting such a surface. Alternatively, the stand may be anchored to a floor, table, or ground surface, by means of bolts or other fasteners, or by being integrally formed with said surface.

The broad, flat base is preferably nearly as wide in diameter as the upending support system is tall, that is, the flat base diameter preferably is about 75% to 130% of the height of the stand, depending mainly on how high the support system is adjusted. Buttresses or other reinforcements preferably extend from the upending portion to the flat base to strengthen the stand overall without unnecessarily increasing the total weight. The flat base is preferably round and preferably tapers from a thicker center area to be thinner near its outer edge, to provide a top surface that slants downward toward the outside. This slanting top surface and thin outer perimeter allow a user to stand on the base with at least one foot and preferably both feet to anchor the stand as it is used. Further, the stand may include holders or fasteners for holding tools and/or replacement hoof platforms for storage and easy access.

One embodiment of the invention includes a polyethylene base formed having a large generally flat base and a narrow, truncated-conical upright receiving portion centrally protruding from the base. A platform is configured to be slidably held within the upright receiving portion and a lock is provided for securing the platform within the upright holder receiving portion at a selected height. A first platform includes a diverging U-shaped cradle attached to its distal end. A flexible strap, such as a nylon webbing, is slung across the cradle and attached to the opposing ends of the cradle to form a hoof- or other object-receiving sling. The cradle and strap are configured to securely hold the hoof or other object, and to absorb concussion associated with horseshoe nailing and hoof maintenance, or other manipulation/work being performed on other objects being supported. In this respect, the sling may be considered one type of firm, yet cushioning structure. A second platform simply provides a generally flat surface to receive the bottom of a hoof (for anterior hoof work), or to receive another object, at an elevated position above the ground. Both platforms are sized and shaped to be closely and slidably received within the upright receiving portion, and to be fixed along their respective lengths relative to the upright receiving portion to-adjust the working height by the adjustable lock.

The combination of the polyethylene base and the preferred flexible-strap cradle provide a cushioning and quiet device for minimizing stress to a horse or other animal, while also providing a firm platform that gives the user a sure, steady and safe work platform on which the hoof, leg, or other part of the animal will not wobble or significantly shift during the work. The generally flat polyethylene base provides a safe and stable support for the stand and diminishes the chance of either the user or the animal from being injured by tripping over, or stepping on, a protruding leg of a stand.

Additionally, the broad plastic base provides for concussion absorption and distribution. The base is preferably formed with a rounded perimeter edge, and from a material which is much softer than the metal used in prior art stands. Additionally, the edges of the cradle are preferably rounded to reduce the chance of injury, as well as the wear on the flexible strap. The combination of the flexible strap and the plastic or similar material base, provide a support system which has been found to be much more acceptable to all horses tested. The inventor believes that pet groomers may find the stand useful for gently and comfortably supporting the head of pet during grooming of both the head and the other portions of the pet.

Additionally, the inventor believes that embodiments of the stand will be advantageous to individuals who wish to support/stabilize inanimate objects, such as guns. A marksman or hunter may use the stand to support the barrel or fore-stock of a gun, because the firm, yet flexible and cushioning, cradle support system will support the gun, allow accurate aiming (due to the flexibility of the sling), and allow shooting, all without removing the gun from the stand and without creating noise or damage to the gun.

Referring specifically to the Figures, the preferred stand includes a broad, generally flat base with a support system upending from the generally flat base, wherein the support system preferably is adjustable in height and includes interchangeable platforms for different positioning and handling of a horse's hoof and foot or of other objects.

In the preferred stand 10, the broad, generally flat base and a generally vertical upright receiving portion are combined in a single, preferably molded plastic base unit, called polyethylene base unit 11. Base unit 11 has large generally flat base 12 and a narrow, truncated-conical upright receiving portion 13 centrally upending from flat base 12. Into the upright receiving portion 13 is slidably inserted a platform 14, which includes post 15 at its lower end and an upper end adapted for comfortable and secure handling of the horse hoof or other object. Additionally, post 15 is configured to be closely but slidably held within the interior bore 16 of upright receiving portion 13. While post 15 may be made of various materials, post 15 is preferably manufactured of metal tubing having an outside diameter slightly less than the inside diameter of bore 16/sleeve 16'. While a circular cross-sectional shape is not necessarily critical to this aspect of the invention, it is preferred that post 15 be slidably received within bore 16, and that post 15 may be locked in place at different elevations in the bore 16, preferably with the different elevations translating to about 8-10 inches of height adjustment. Although other height adjustment ranges may be incorporated into the stand design, 8-9 inches is a preferred range for stands to be used by horseowner's or farriers, as that range fits most user's and most horses comfortably.

Thus, one may see that the support system of the preferred embodiment includes cooperating upright receiving portion 13 and platform 14, wherein platform 14 that may be raised and lowered in receiving portion 13 to adjust the overall height of the stand 10. By adjusting the overall height of the stand 10, the user sets the exact elevation of the top surface of the platform relative to the bottom surface of the base 12, which, in effect, adjusts the elevation of the top surface of the platform relative to the ground or floor upon which the stand rests.

An adjustable lock 17 cooperates between upright receiving portion 13 and platform 14 to secure post 15 within the base unit 11 at a selected height. In the preferred embodiment, adjustable lock 17 includes a set-screw style threaded shaft 27' with user-accessible knob 27, which may be turned to lock the post 15 in place at a particular height in the bore 16. Shaft 27' extends through the wall of upright receiving portion 13, threadably engaging the wall surface of hole 28, and into the bore 16 to frictionally engage the post 15. The knob 27 is sized large enough to comfortably fit in a user's palm, so the user may comfortably apply enough force when turning in the lock 17 to secure the post against slippage. The outer surface 115 of post 15 should be a smooth cylindrical surface, so that engagement of the shaft 27' on the outer surface may be done at any radial and axial position on the post. By "smooth" is meant that there are no significant ridges or grooves or other ledges that would interfere with continuous adjustment of the post in the base unit.

It should be noted that, while other lock mechanisms may be implemented, such as a tightening collet, pin and through hole, ratchet and pawl, or others, the preferred lock mechanism should allow continuous rather than incremental adjustment of height, so that extremely small adjustments may be made smoothly. Ratchet mechanisms or pin-through-hole mechanisms are definitely less preferred, because they are inherently incremental. Such incremental adjustments do not provide the very minute height adjustments that are important when working with the stand 10 and a horse's hoof/foot. Also, as discussed below, incremental adjustments typically have the added problem of creating a jerky or noisy adjustment, which, when made during the work on a horse hoof/foot as it often the case, can scare or stress the animal.

Platform 14 has at its upper distal end a sling cradle unit 22, made from diverging "U" shaped cradle 18 plus a flexible strap 21 that extends across the cradle 18 to form the upper surface of the cradle unit 22. Cradle 18 is made from metal bent to form a central web portion 19 and two outwardly and upwardly extending arms 20 that preferably rigidly and non-pivotally extend from the web portion 19, and wherein there are no hinges or moving joints in the cradle 18. The top ends of arms 20 preferably have rounded corners and/or rounded edges to reduce the chance of injury and wear on strap 21.

Flexible strap 21, preferably manufactured of a nylon strap material, is slung across cradle and attached to the opposing ends of arms 20, creating a space 121 between the strap 21 and the web portion 19. Here, strap 21 is attached to the outside upper surfaces of arms 20 using a pair of metal strap plates 23 and cooperating bolts and nuts 24. Strap plates 23 extend across substantially the entire width of the strap 21, to provide even and firm pressure across the strap 21 at both ends of the strap 21, so that there is little chance of the strap pulling out from under the plates and off of the cradle 18. Advantageously, the bolts are countersunk in upwardly extending arms 20. This configuration ensures that the heads of the bolts are shielded, by strap 21, from coming into contact with the hoof. Cradle 14 and strap 21 are sized to create a flexible curved surface, for example, to contact a substantial portion of the curved anterior surface of a hoof to securely hold the hoof and absorb concussion associated with nailing and hoof maintenance. By providing a cradle unit 22 that does not flex, pivot, or otherwise move, except for the flexing of the strap 21, a horseowner or farrier may be confident of secure placement of the horse's hoof and the horse does not experience unexpected or sudden movement or shifting of its hoof/foot.

Figure 8:
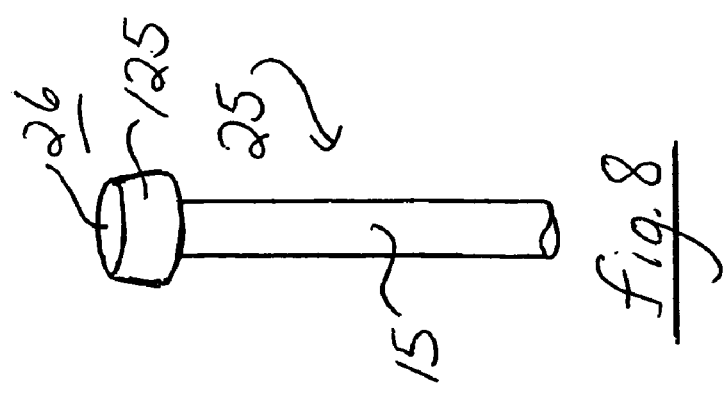
FIG. 8 is a detail view of one embodiment of an platform, which platform has a flat top surface.
Figure 6:
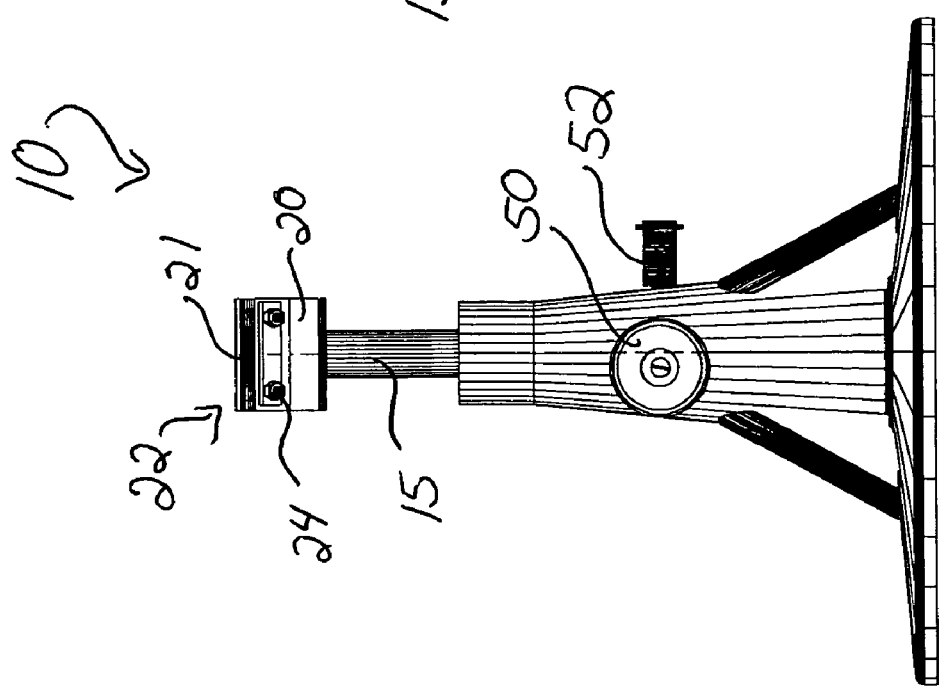
Figure 9:
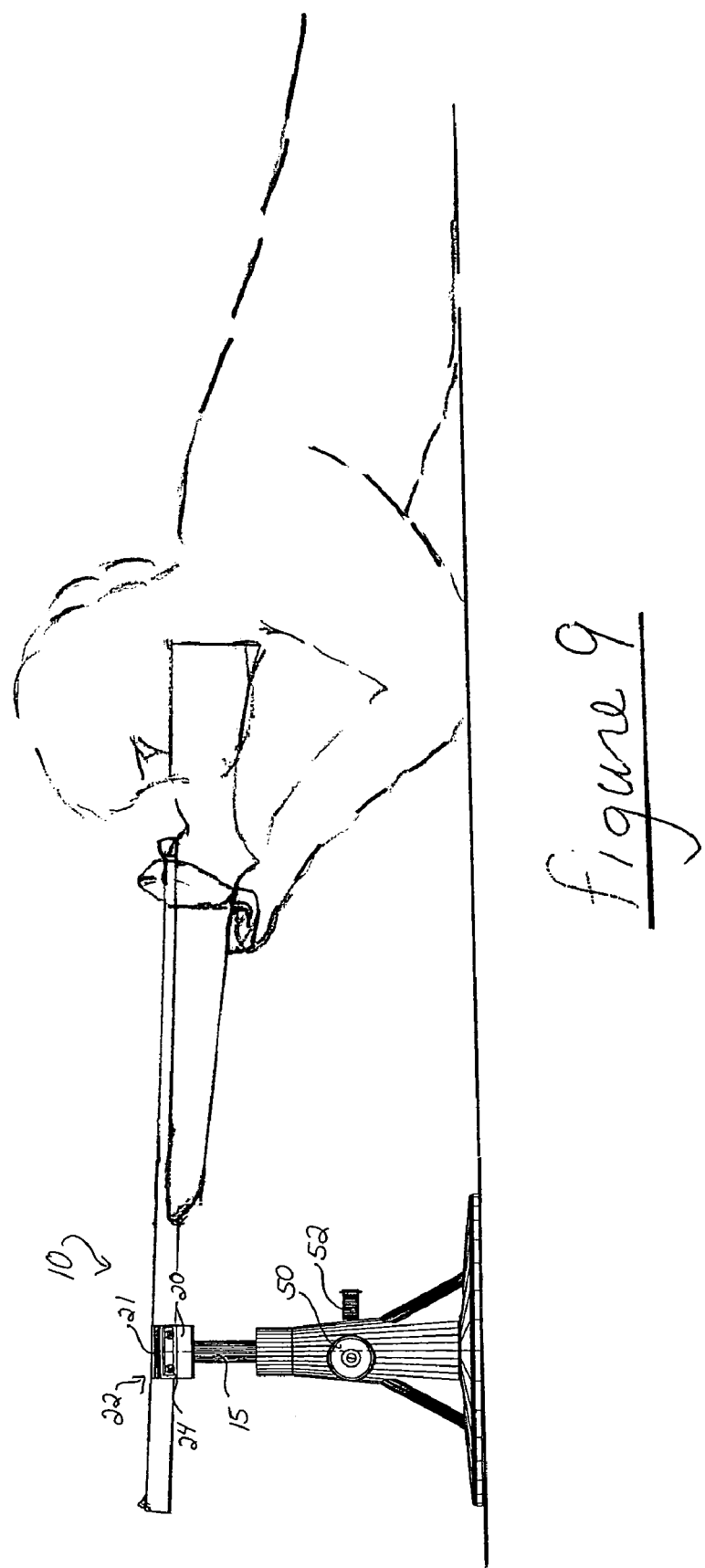
FIG. 9 schematically illustrates an embodiment of the invented stand in use supporting a front portion of a firearm.

Platform 14 is removable from the base unit 11, so that alternative platforms may be installed. An example of an alternative platform 25 ("second platform 25") is shown in FIG. 8. Second platform 25 is slidably and lockably received by upright receiving portion 13 in place of first platform 14. Second platform 25 does not have cradle 18, but instead an upper flat surface 26. Upper flat surface 26 provides a flat surface to receive the bottom of a hoof at an elevated position above the ground for anterior hoof work, or to receive another object in an alternative position.

The base unit 11 of the preferred embodiment is approximately twelve and one-half inches high, post 15 is approximately ten inches long and cradle 18 is approximately 2½-3 inches high. Additionally, web 19 is approximately 3-3½ inches long while arms 20 are approximately 2½-3 inches long. Arms 20 preferably extend upward at opposing angles of approximately sixty degrees with respect to horizontal, as illustrated by angle "A" in FIG. 3, and preferably angle A is in the range of 50-70 degrees. Strap 21 is approximately 8-10 inches long with approximately 1½ inch overlaps extending down the outside of each arm 20, leaving approximately 5-7 inches to form sling 22. Strap 21 and cradle 18 are each approximately three inches wide (measured transverse to the long dimension of the cradle). The top surface of second platform 25 may be various dimensions, but preferably it is just slightly larger than the diameter of the post 15. Preferably, a rubber or other non-metal cap 125 is placed on the post, wherein the rubber or non-metal material is firm but not hard, so that there is a slight resilience or cushioning effect, but not a spongy or unstable effect when the hoof or other object is placed, or moves, on the cap 125. As an alternative to, or in addition to, the flexible strap, a cushion material may be placed in the cradle 18 but the cushion should be a firm cushion that supports and controls the hoof or other object during work on the hoof/object.

When the lock is loosened, the platforms 14, 25 may slide down to a maximum extent into the receiving portion 13 for compact carrying and handling. While these dimensions accommodate most horses quite well, it should be noted that at least the cradle and sling dimensions can be modified to accommodate different sized horses, such as draft horses or miniature horses.

It should be noted that the platforms may be adapted to the special needs or wishes of other users. For example, a cradle for a gun stand may be designed differently than the cradle shown in the figures. The arms of the cradle may be closer together, so that the web is only approximately 2 inches long, for example. The arms may extend closer to 90 degrees up from the web, that is, angle A may be in the range of about 80-100 degrees, and preferably 90 degrees. The web, arms and strap may be narrower in their transverse dimension, for example, approximately ¾-1 inch, for example.

The stand 10 preferably includes one or more holders for tools and/or optional platforms. In the preferred embodiment, a magnetic holder 50 is supplied on the outside surface of the receiving portion 13. This is excellent for holding metal tools, such as files. A Velcro™ strap loop-style holder 52 is also provided, for being strapped around a tool or, more preferably, around the post of an alternative platform. Because the receiving portion 13 is preferably substantially plastic, the tool being held on the portion 13 will not "clank" against the outer surface of portion 13, so the horse or other animal is not frightened by movement of such accessories.

Buttresses 55 are preferably included on the base unit 11 between the receiving portion 13 and the flat base 12. As may be seen to best advantage in FIGS. 1 and 3, each buttress 55 is a vertical, generally triangular wall that extends from the generally horizontal top surface of the flat base 12 to the outer surface of the receiving portion 13, wherein the outermost edge 55' of each buttress extends upward from the flat base 12 and slants inward toward the upright receiving portion 13. These buttresses serve to strengthen the stand 10 without adding undue weight.

The flat base 12 is called "flat" but most preferably slants downward to a thin, rounded outer perimeter edge 56 from a slightly thicker center region 58. At its outer perimeter edge 56, the base 12 is preferably less than 1 inch thick. This top slanted base surface 60 is an excellent surface for the user to stand upon while working with a horse, thus, stabilizing the stand 10 and preventing it from tipping over or shifting in position. The user places the stand 10 between his legs and stands on the base 12, which provides for the horse a "feel" similar to what the horse is used to during hoof maintenance, but with more security and sureness and with less movement.

The preferred embodiment provides positive answers to many objects that are desired in a stand for horses. Because the preferred base 12 is all or substantially plastic (preferably polyethylene), the base 12 does not make significant noise against the floor/ground. Because the preferred stand 10 has a smooth, non-ratchet adjustment system, it does not make significant noise during use and adjustment. Rather than the uneven and jerky movement of ratcheted metal pieces, the preferred stand 10 has a post moving smoothly in a base unit in a non-jerky manner. Also, the continuous adjustment afforded by the set-screw style adjustment system is superior to incremental adjustments, for effectiveness and convenience and accuracy when working with the horse.

Figure 5:
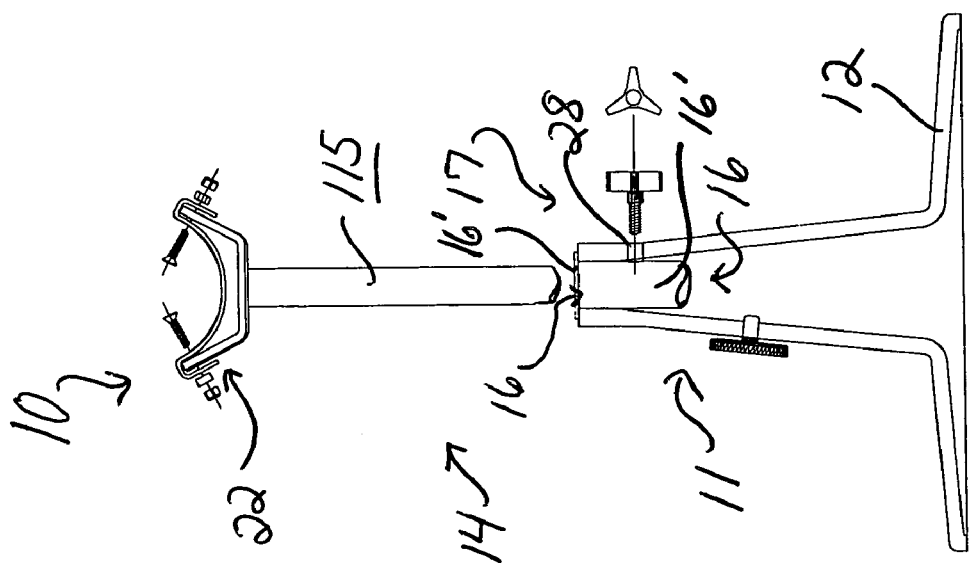
FIG. 5 is an exploded side view of the embodiment of FIG. 4.
Figure 4:
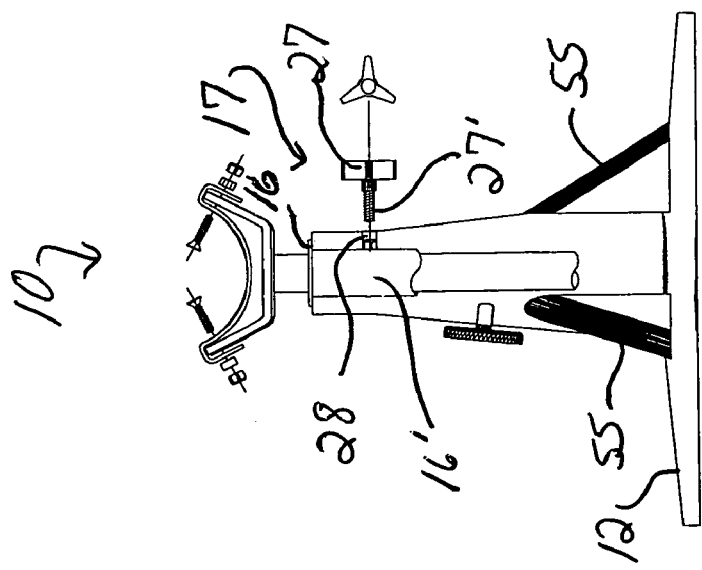
FIG. 4 is a partial-cross-sectional side view of the embodiment of FIGS. 1-3, illustrating one embodiment of a height-adjustment mechanism.
Figure 7:
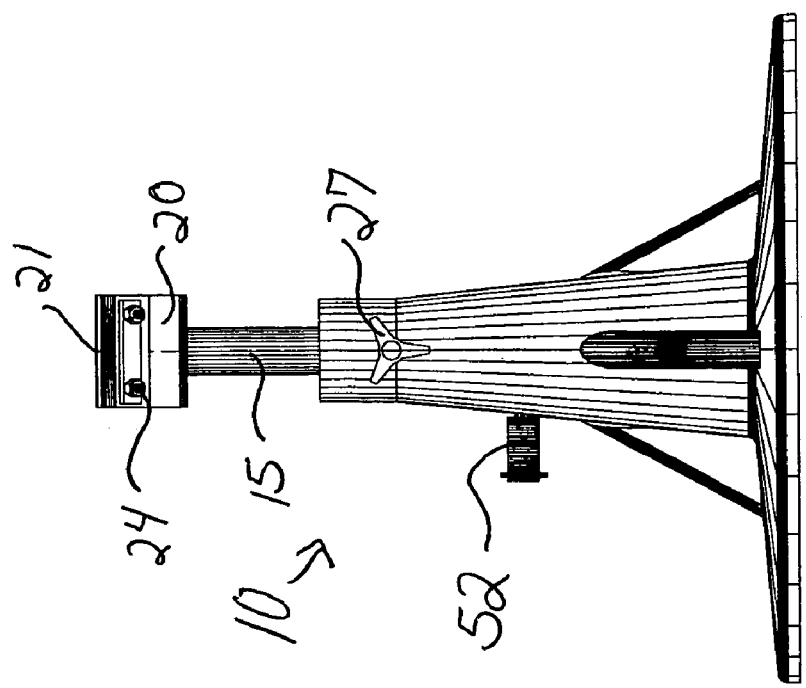
FIGS. 6 and 7 are left and right side views of the embodiment of FIGS. 1-3.

Further, the preferred rigid U-shaped cradle with slightly-diverging arms provides a proper shape and "feel" for the horse. The cradle 18 does not move when the horse's foot/hoof is rested in it, rather, the strap 21 on the cradle slightly, smoothly, and gently deforms to cushion the foot/hoof. There is no clamping feeling given to the foot and no noise or sensation of significant movement. The combined effect of the preferred plastic base and the set-screw style system, and the rigid U-shaped cradle, both produce a surprisingly quiet and calming device for working with a horse. The preferred substantially plastic stand does not produce a metallic sound when it is brought up to the animal, when it is moved on a hard surface, or when it is adjusted or used. The bore 16 in the base unit may be plastic or may be lined with a sleeve 16', as shown in FIGS. 4 and 5. The sleeve 16' may be plastic, so that the height adjustment involves metal to plastic contact of the post in the bore, not metal to metal movement/contact. Alternatively, the sleeve 16' may be metal and the wall surface of hole 28 may be metal, increasing durability and reliability of the height adjustment system. Whether the bore wall is plastic or metal, the horse is hardly aware of the non-intimidating device during its use and adjustment and is not frightened by sound or movement. This is a surprising difference in horse behavior compared to horse behavior with prior art metal stands.

Further, the invented stand 10 is lightweight and easy and safe to carry, as it preferably weights less than 8 pounds and has no sharp edges.

Alternative embodiments may include bases, upright receiving portions, and platforms of different shape, size, and materials from those detailed above. The base may be rectangular, square, or oval, for example. While it is preferred to have the upright receiving portion generally centered on the base, it is not absolutely necessary. The upright receiving portion, for example, may be offset toward one edge of the base in order to provide a base side extension for the user to stand on or to attach to a table or other surface. Also, while it is preferred to have a generally flat base so that a user may comfortably stand on the base, the base may be non-flat and may be thick or irregular in shape and thickness, especially for embodiments that will be mounted on a table, bench, or other surface. Further, the upright receiving portion need not necessarily be a cone shape or have buttresses, but may be other shapes and thicknesses. For example, an upright receiving portion with rectangular or oval transverse cross-section may be used. While it is preferred to have a platform that surrounds/contacts the hoof or other object on only one, two, of three sides, and that does not trap the hoof/object, alternative platforms may be used, including those that surround the object on four or more sides and those that clamp the object, for example. While polyethylene is preferred for substantial portions of the stand, other materials may be used, including other polymeric and composite materials.

Although this invention has been described above with reference to particular means, materials and embodiments, it is to be understood that the invention is not limited to these disclosed particulars, but extends instead to all equivalents within the scope of the following claims.

I claim:

1. A stand for care of an animal, the stand comprising:
   a base unit made substantially of plastic and having a generally flat base having a generally horizontal top surface and a truncated-conical upright receiving portion extending up centrally from the base, and said base unit further comprising a plurality of vertical generally triangular buttress walls extending upward from said generally horizontal top surface to connect to said upright receiving portion, each vertical buttress wall having an outermost edge slanting inward toward said upright receiving portion, wherein said plurality of vertical buttress walls are spaced apart around said upright receiving portion;
   a platform, for receiving a body part of the animal, slidably received in the upright receiving portion for being raised and lowered relative to the base; and
   a lock mechanism that locks the platform in the base at selected heights relative to the base;
   wherein the platform comprises a top end cradle with a web portion and two arms rigidly and non-pivotally extending up from the web portion, and the platform further comprises a cushion in the top end cradle for receiving said animal body part.

2. A stand as in claim 1, wherein the platform comprises a post slidably received in the upright receiving portion, the post having a smooth outer surface, and wherein the lock mechanism is a set screw mechanism having a threaded shaft that engages the smooth outer surface to lock the post at a height relative to the base, and the post having a hand-operated knob accessible to a user outside the base unit for turning said shaft to engage said smooth outer surface.

3. A stand as in claim 1, wherein the base unit has an outer generally vertical side surface and the stand further comprises a plurality of holders extending out from the vertical side surface for removably receiving a tool.

4. A stand as in claim 1, wherein said platform is removable from the base unit, and the stand further comprises an alternative platform that is adapted to slide into the base unit in place of said platform.

5. A stand as in claim 4, wherein said alternative platform has a generally flat top surface.

6. A stand as in claim 4, wherein the base unit has an outer generally vertical side surface and the stand further comprises a holder extending out from the vertical side surface for removably receiving said alternative platform.

7. A stand for care of an animal as in claim 1, further comprising a second platform for being slidably received in the upright receiving portion for receiving a body part of the animal; and
wherein said lock mechanism locks said second platform in the base at selected heights relative to the base; and
wherein the second platform comprises a cap having a generally flat top surface.

8. A stand for care of an animal as in claim 7, wherein said cap of the second platform is a non-metal cap.

9. An adjustable stand for care of an animal, the stand comprising:
a base unit having a base for being placed on a generally horizontal surface and an upright receiving portion upending from the base;
a platform consisting of a post slidably received in the upright receiving portion for being raised and lowered relative to the base, a cradle connected to the post and having a generally horizontal web and two arms rigidly extending from the web, and a flexible sling extending between the arms and being spaced from the web, wherein the sling has an upper surface that receives an animal body part during work on said animal; and
a lock mechanism that locks the platform post in the base at selected heights relative to the base;
wherein the cradle is a diverging-U-shaped cradle wherein the web is horizontal and the two aims diverge from each other to both be about 50-70 degrees relative to horizontal.

10. A stand as in claim 9, wherein the arms each have a length that is less than the length of the web.

11. A stand as in claim 9, wherein the web is about 3-3½ inches long and the arms are each about 2½ to 3 inches long.

12. An adjustable stand for care of an animal, the stand comprising:
a base unit having a base for being placed on a generally horizontal surface and an upright receiving portion upending from the base;
a platform consisting of a post slidably received in the upright receiving portion for being raised and lowered relative to the base, a cradle connected to the post and having a generally horizontal web and two arms rigidly extending from the web, and a flexible sling extending between the arms and being spaced from the web, wherein the sling has an upper surface that receives an animal body part during work on said animal; and
a lock mechanism that locks the platform post in the base at selected heights relative to the base; and the stand, further comprising an alternate platform having a bottom end slidably received in the base unit and having a generally flat top end;
wherein the platform and the alternate platform may be interchanged for different animal-care purposes.

13. An adjustable stand for care of an animal, the stand comprising:
a base unit having a base for being placed on a generally horizontal surface and an upright receiving portion upending from the base;
a platform consisting of a post slidably received in the upright receiving portion for being raised and lowered relative to the base, a cradle connected to the post and having a generally horizontal web and two arms rigidly extending from the web, and a flexible sling extending between the arms and being spaced from the web, wherein the sling has an upper surface that receives an animal body part during work on said animal; and
a lock mechanism that locks the platform post in the base at selected heights relative to the base;
wherein said generally flat base has a central region from which the upright receiving portion upends, and an outer perimeter edge, and an upper surface that slants from the central region downward to the outer perimeter.

14. An adjustable stand for care of an animal, the stand comprising:
a base unit having a base for being placed on a generally horizontal surface and an upright receiving portion upending from the base;
a platform consisting of a post slidably received in the upright receiving portion for being raised and lowered relative to the base, a cradle connected to the post and having a generally horizontal web and two arms rigidly extending from the web, and a flexible sling extending between the arms and being spaced from the web, wherein the sling has an upper surface that receives an animal body part during work on said animal; and
a lock mechanism that locks the platform post in the base at selected heights relative to the base;
wherein the base unit has an outer generally vertical side surface and the stand further comprises a magnetic holder extending out from the vertical side surface for removably receiving a tool.

15. An adjustable stand for care of an animal, the stand comprising:
a base unit having a base for being placed on a generally horizontal surface and an upright receiving portion upending from the base;
a platform consisting of a post slidably received in the upright receiving portion for being raised and lowered relative to the base, a cradle connected to the post and having a generally horizontal web and two arms rigidly extending from the web, and a flexible sling extending between the arms and being spaced from the web, wherein the sling has an upper surface that receives an animal body part during work on said animal; and
a lock mechanism that locks the platform post in the base at selected heights relative to the base;
wherein said platform is removable from the base unit, and the stand further comprises an alternative platform that is adapted to slide into the base unit in place of said platform.

16. A stand as in claim 15, wherein the base unit has an outer generally vertical side surface and the stand further comprises a holder extending out from the vertical side surface for removably receiving said alternative platform.

17. An adjustable stand for care of an animal, the stand comprising:
a base unit having a base for being placed on a generally horizontal surface and an upright receiving portion upending from the base;
a platform consisting of a post slidably received in the upright receiving portion for being raised and lowered relative to the base, a cradle connected to the post and having a generally horizontal web and two arms rigidly extending from the web, and a flexible sling extending between the arms and being spaced from the web, wherein the sling has an upper surface that receives an animal body part during work on said animal; and a lock mechanism that locks the platform post in the base at selected heights relative to the base; wherein the lock mechanism comprises a threaded shaft extending through said upright receiving portion to contact said post.

18. An adjustable stand for care of an animal, the stand comprising:

a base unit having a base for being placed on a generally horizontal surface and an upright receiving portion upending from the base;

a platform consisting of a post slidably received in the upright receiving portion for being raised and lowered relative to the base, a cradle connected to the post and having a generally horizontal web and two arms rigidly extending from the web, and a flexible sling extending between the arms and being spaced from the web, wherein the sling has an upper surface that receives an animal body part during work on said animal; and a lock mechanism that locks the platform post in the base at selected heights relative to the base;

wherein the lock mechanism comprises a threaded shaft threadably connected to, and extending through, said upright receiving portion to contact said post.

19. A method of supporting a horse hoof during maintenance of the hoof, the method comprising:

providing a stand on a supporting ground or floor surface, the stand comprising a base unit having a generally flat base made of plastic and an upright receiving portion extending up from the base, a platform slidably and lockably received in the upright receiving portion for being raised and lowered relative to the base;

laying the hoof in or on the platform and performing said maintenance; and moving said stand relative to, and in contact with, the ground or floor surface without any metallic sound by means of said generally flat base being made of plastic, so that the horse is not frightened by metallic sounds; wherein said upright receiving portion has an outer surface that is a truncated-cone shape, and wherein said base unit further comprising a plurality of vertical, generally triangular buttress walls extending upward from a top surface of said generally flat base to connect to said truncated-cone-shaped outer surface and wherein each vertical buttress wall has an outermost edge slanting inward toward said outer surface, wherein said plurality of vertical buttress walls are spaced apart around said upright receiving portion; and wherein said method further comprises a user stepping on said generally flat base during the user performing said maintenance on said hoof.

20. A method of supporting a horse hoof as in claim 19, wherein the platform comprises a top end cradle with a web portion and two arms rigidly and non-pivotally extending up from the web portion, and the platform further comprises a cushion in the top end cradle for receiving said hoof.

21. A method of supporting a horse hoof as in claim 19, wherein the platform comprises a cap having a generally flat top surface.

22. A method of supporting a horse hoof as in claim 19, wherein the platform comprises a non-metal cap having a generally flat top surface.

* * * * *